United States Patent
Li et al.

(10) Patent No.: US 10,131,337 B2
(45) Date of Patent: Nov. 20, 2018

(54) RELAY VALVE MODULE OF A PNEUMATIC BRAKE SYSTEM

(71) Applicant: Automotive Research & Testing Center, Lugong (TW)

(72) Inventors: Ping-Yan Li, Lugong (TW); Chien-An Chen, Lugong (TW); Po-Hsu Lin, Lugong (TW)

(73) Assignee: Automotive Research & Testing Center, Lugong (TW)

( * ) Notice: Subject to any disclaimer, the term of this patent is extended or adjusted under 35 U.S.C. 154(b) by 152 days.

(21) Appl. No.: 15/393,643

(22) Filed: Dec. 29, 2016

(65) Prior Publication Data

US 2018/0186356 A1 Jul. 5, 2018

(51) Int. Cl.
*B60T 15/02* (2006.01)

(52) U.S. Cl.
CPC .................. *B60T 15/027* (2013.01)

(58) Field of Classification Search
CPC ........ B60T 8/327; B60T 8/361; B60T 13/263; B60T 13/683; B60T 15/027
See application file for complete search history.

(56) References Cited

U.S. PATENT DOCUMENTS

| | | | | |
|---|---|---|---|---|
| 3,947,072 A * | 3/1976 | Plantan | ................. | B60T 13/263 303/13 |
| 4,446,950 A * | 5/1984 | Wise | ....................... | B60R 25/08 180/287 |
| 5,042,883 A * | 8/1991 | McCann | ................. | B60T 8/327 303/14 |
| 5,429,426 A * | 7/1995 | Hart | ...................... | B60T 13/406 303/33 |
| 5,564,794 A * | 10/1996 | Hart | ...................... | B60T 13/665 303/15 |
| 5,988,771 A * | 11/1999 | Sakamoto | ............. | B60T 8/3235 303/119.3 |
| 6,116,280 A * | 9/2000 | Goodell | .................. | B60T 8/361 137/102 |
| 6,247,764 B1 * | 6/2001 | Koelzer | .................. | B60T 8/323 303/118.1 |
| 6,270,168 B1 * | 8/2001 | McCann | ............... | B60T 13/263 303/7 |

(Continued)

FOREIGN PATENT DOCUMENTS

CN 103350695 B 8/2015
EP 3118077 A1 * 1/2017 ............ B60T 15/027

*Primary Examiner* — Thomas W Irvin
(74) *Attorney, Agent, or Firm* — Brinks Gilson & Lione (57) ABSTRACT

A relay valve module of a pneumatic brake system for a vehicle includes a relay valve and an actuating unit. A valve body of the relay valve defines therein an air supply chamber in fluid communication with a supply air reservoir, and a delivery chamber in fluid communication with brake cylinders. A valve seat is disposed between the air supply and delivery chambers; and is opened and closed by movement of a valve member that is actuated by a piston slidable relative to the valve body. The actuating unit includes a stem assembly moved by a pressure to press the piston so as to move the valve member, and an actuating assembly electrically connected with an electronic control unit of the vehicle to receive a brake signal therefrom to provide the pressure to the stem assembly.

8 Claims, 6 Drawing Sheets

(56) References Cited

U.S. PATENT DOCUMENTS 7,415,341 B2 * 8/2008 Goebels .............. B60R 16/0233
303/113.2
7,577,509 B2 8/2009 Goebels
9,157,543 B2 * 10/2015 Herges ...................... B60T 7/20

* cited by examiner

RELAY VALVE MODULE OF A PNEUMATIC BRAKE SYSTEM

FIELD

The disclosure relates to a pneumatic brake system for a vehicle, and more particularly to a relay valve module of a pneumatic brake system.

BACKGROUND

A conventional pneumatic brake system for a large heavy vehicle, such as a truck, a bus, a trailer, etc., includes an air compressor, an air reservoir carrying pressurized air from the air compressor, a conduct line connected with the air reservoir and a relay valve, a plurality of brake cylinders connected with the relay valve, a first brake line connected with the air reservoir and a brake pedal, and a second brake line connected with the brake pedal and the relay valve.

In a normal driving situation, pressurized air is sent from the air reservoir to the relay valve and the brake pedal through the conduct line and the first brake line, respectively, but does not flow through the relay valve so as not to actuate the brake cylinders for applying a braking action.

When a driver depresses the brake pedal to cause pressurized air to pass through the second brake line, the pressurized air urges the relay valve so as to open the relay valve, whereby the pressurized air with a high pressure flows to the brake cylinders for applying a braking action.

However, in a long vehicle, such as a bus, the second brake line must be relatively long and air pressure therein has to be sufficient to activate the relay valve, which leads to a long response time and results in a time delay of the braking action.

SUMMARY

Therefore, an object of the disclosure is to provide a relay valve module of a pneumatic brake system that can alleviate at least one of the drawbacks of the prior art.

According to the disclosure, the relay valve module of a pneumatic brake system is utilized in a vehicle which includes an electronic control unit, a supply air reservoir and a plurality of brake cylinders, and includes a relay valve and an actuating unit. The relay valve has a valve body which defines therein an air supply chamber in fluid communication with the supply air reservoir and a delivery chamber in fluid communication with the brake cylinders, a valve seat which is disposed between the air supply and delivery chambers, a valve member which is disposed to be moved relative to the valve body between an opened position, where the valve member is remote from the valve seat to permit air flow from the air supply chamber to the delivery chamber, and a normal closed position, where the valve member contacts the valve seat to obstruct the air flow, and a piston which is disposed within and slidable relative to the valve body to move the valve member to the opened position. The actuating unit includes a stein assembly which has a first end disposed within the valve body and adjacent to the piston, and which is moved by a pressure to permit the first end to be engaged with and press the piston so as to move the valve member to the opened position, and an actuating assembly which is electrically connected with the electronic control unit to receive a brake signal therefrom to provide the pressure to the stem assembly.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
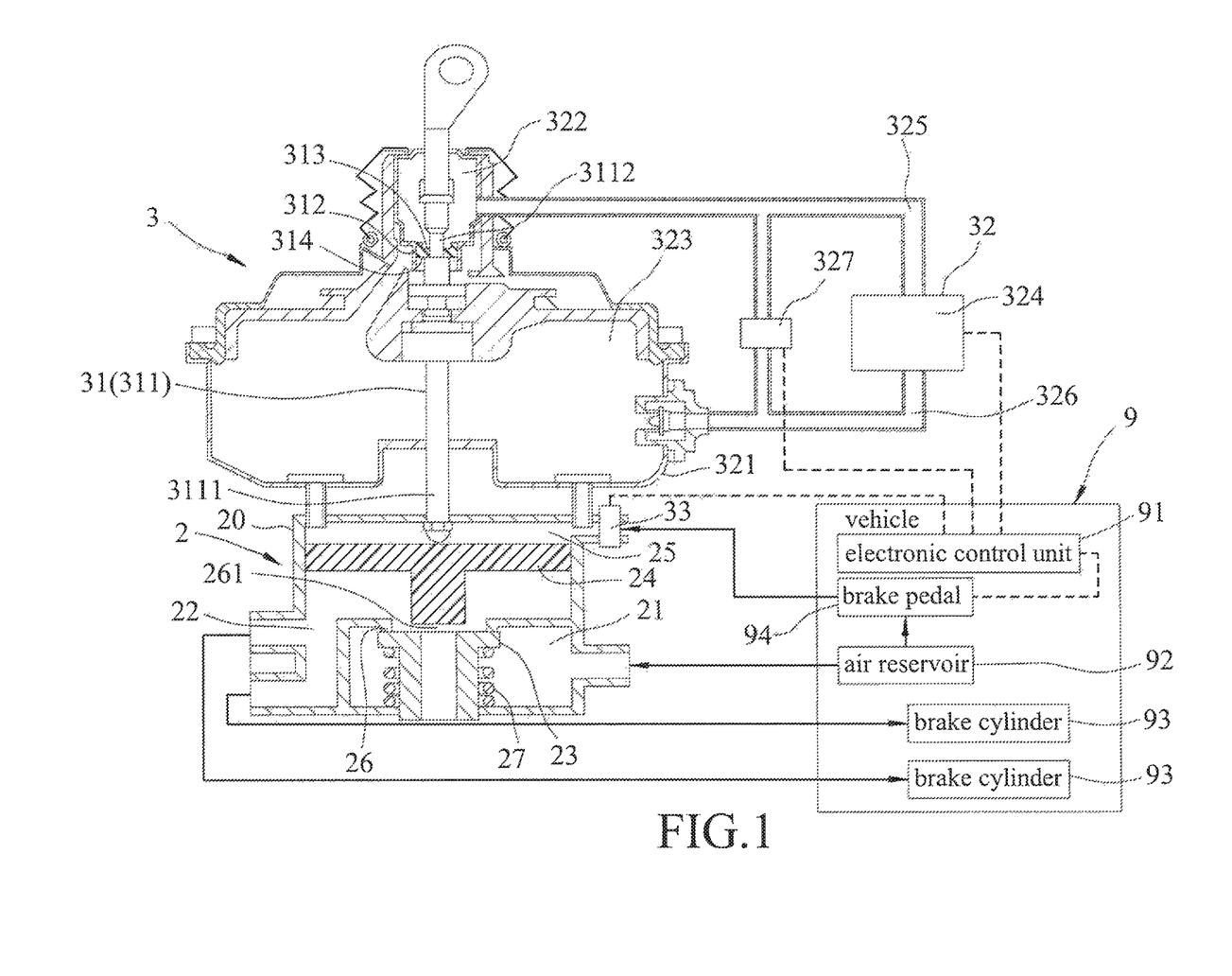
FIG. 1 is a schematic, partly-sectional view illustrating an embodiment of a relay valve module according to the disclosure.
Figure 2:
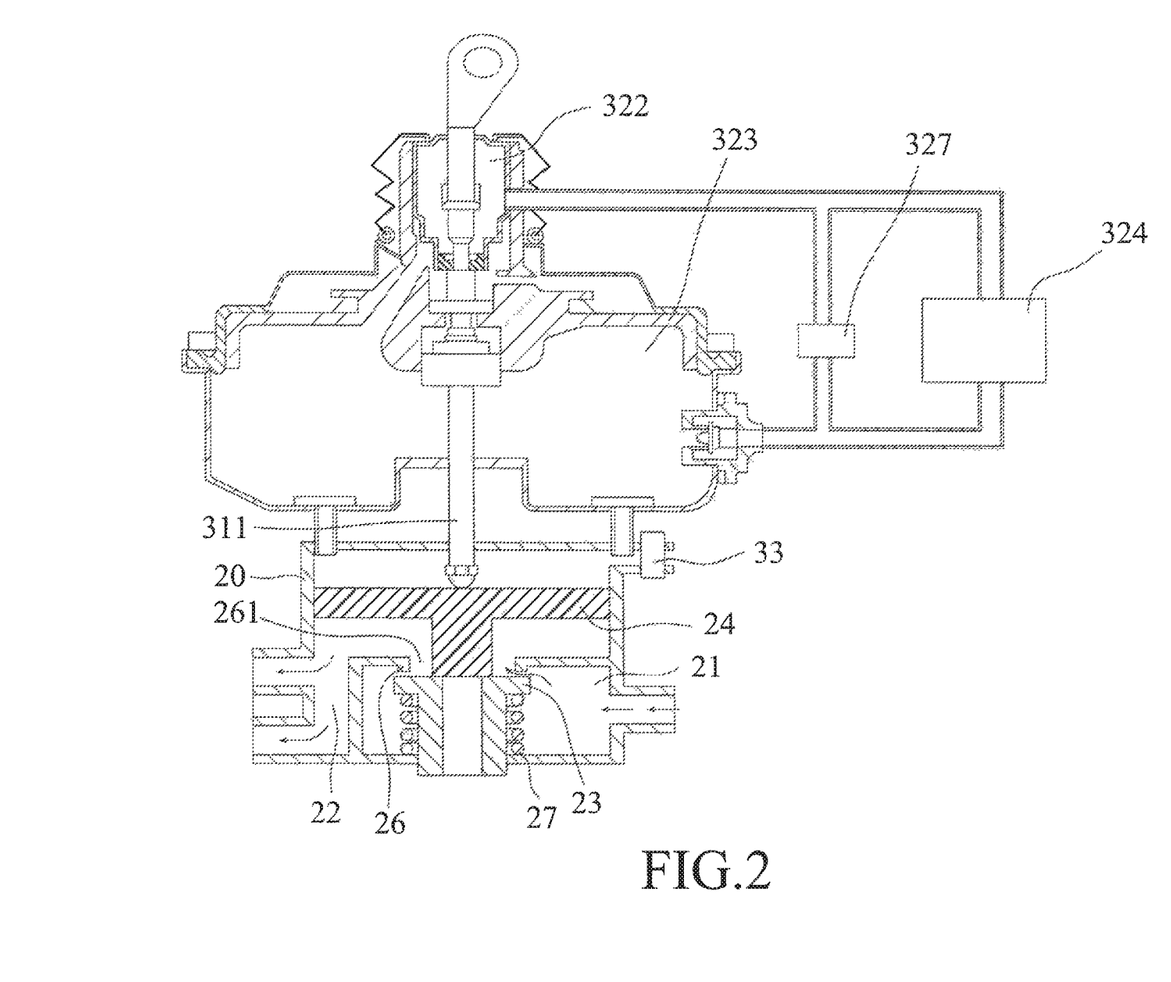
FIG. 2 is a schematic, partly-sectional view illustrating a state when a piston of the embodiment is pressed to move a valve member to an opened position.

Referring to FIGS, 1 and 2, an embodiment of a relay valve module of a pneumatic brake system is utilized in a vehicle 9. The vehicle 9 includes an electronic control unit (ECU) 91, a supply air reservoir 92, a plurality of brake cylinders 93 and a brake pedal 94 connected with the supply air reservoir 92 and electrically connected with the electronic control unit 91.

The relay valve module includes a relay valve 2 and an actuating unit 3.

The relay valve 2 has a valve body 20 which defines therein an air supply chamber 21 in fluid communication with the supply air reservoir 92 and a delivery chamber 22 in fluid communication with the brake cylinders 93, a valve seat 26 which is disposed between the air supply and delivery chambers 21, 22 and which confines a valve opening 261 that surrounds an axis, a valve member 23 which is disposed to be moved relative to the valve body 20 between an opened position (as shown in FIG. 2), where the valve member 23 is remote from the valve seat 26 to permit air flow from the air supply chamber 21 to the delivery chamber 22 through the valve opening 261, and a normal closed position (as shown in FIG. 1), where the valve member 23 contacts the valve seat 26 to obstruct the air flow, and a piston 24 which is disposed within and slidable relative to the valve body 20 along the axis to be pressed through the valve opening 261 to engage and press the valve member 23 to the opened position, and a biasing member 27 which is disposed to bias the valve member 23 to return to the normal closed position to close the valve opening 261. The valve body 20 further defines therein a back-up supply chamber 25 at an opposite side of the piston 24 relative to the valve member 23.

The actuating unit 3 includes a stem assembly 31, an actuating assembly 32 and a back-up solenoid valve 33. The stem assembly 31 has a stem 311 which extends along the axis and which has a first end 3111 disposed in the back-up supply chamber 25 of the valve body 20 and adjacent to the piston 24. The stem assembly 31 is moved by a pressure to permit the first end 3111 to be engaged with and press the piston 24 so as to move the valve member 23 to the opened position. The actuating assembly 32 is electrically connected with the electronic control unit 91 of the vehicle 9 to receive a brake signal therefrom to provide the pressure to the stem assembly 31. The back-up solenoid valve 33 is electrically connected with the electronic control unit 31, and is in fluid communication with the back-up supply chamber 25 and the brake pedal 94 to be energized responsive to a brake signal to supply air to the back-up supply chamber 25 so as to provide an air pressure to press the piston 24. In this embodiment, the brake pedal 94 is depressed by the vehicle driver to generate and send the brake signal by the electronic control unit 91.

Specifically, the actuating assembly 32 has a housing 321 which is mounted on the valve body 20 and which defines a chamber therein. The stem 311 of the stem assembly 31 has a second end which is disposed in the chamber of the housing 321. A partition 312 is disposed on and extends radially from the stem 311 to be slidable relative to the housing 321 along the axis, and is configured to partition the chamber of the housing 321 into first and second chamber portions 322, 323 that are respectively distal from and proximate to the piston 24, such that the partition 312 has first and second pressed surfaces 313, 314 that face the first and second chamber portions 322, 323, respectively. The actuating assembly 32 further has a vacuum pump 324 which is electrically connected with the electronic control unit 31 and which has an outlet tubular segment 325 that is disposed to be in fluid communication with and to supply air to the first chamber portion 322 so as to generate the pressure in the first chamber portion 322 sufficient to move the stem assembly 31, and an intake tubular segment 326 that is disposed to be in fluid communication with the second chamber portion 323 to receive returned air from the second chamber portion 323.

The actuating assembly 32 further has a restoration solenoid valve 327 which is electrically connected with the electronic control unit 91 and which has two ports respectively in fluid communication with the outlet and intake tubular segments 325, 326 to be energized responsive to a brake signal to shut off fluid communication between the outlet and intake tubular segments 325, 326.

In a normal driving situation when a brake is not applied, no brake signal is generated, and the restoration solenoid valve 327 is opened to be in fluid communication with the outlet and intake tubular segments 325, 326 while no pressurized air is supplied to the first chamber portion 322 by the vacuum pump 324, so that the stem assembly 31 and the piston 24 are not moved, and that the valve member 23 is in the normal closed position to obstruct the air flow between the air supply chamber 21 and the delivery chamber 22. Hence, the pressurized air supplied from the supply air reservoir 92 is not sent to the brake cylinders 93.

When the driver depresses the brake pedal 94, a brake signal is sent from the electronic control unit 91 to both the vacuum pump 324 and the restoration solenoid valve 327. At this time, the restoration solenoid valve 327 is shut to block the fluid communication between the outlet and intake tubular segments 325, 326, and the vacuum pump 324 is actuated to send pressurized air to the first chamber portion 322 so as to generate the pressure (where the pressure in the first chamber portion 322 is larger than that in the second chamber portion 323) sufficient to drive the stem assembly 31 to press the piston 24 as well as the valve member 23 along the axis against the biasing action of the biasing member 232, so as to open the valve opening 261. In this state, the pressurized air with high pressure supplied from the supply air reservoir 92 flows through the delivery chamber 22 and to the brake cylinders 93 for applying a braking action.

Figure 3:
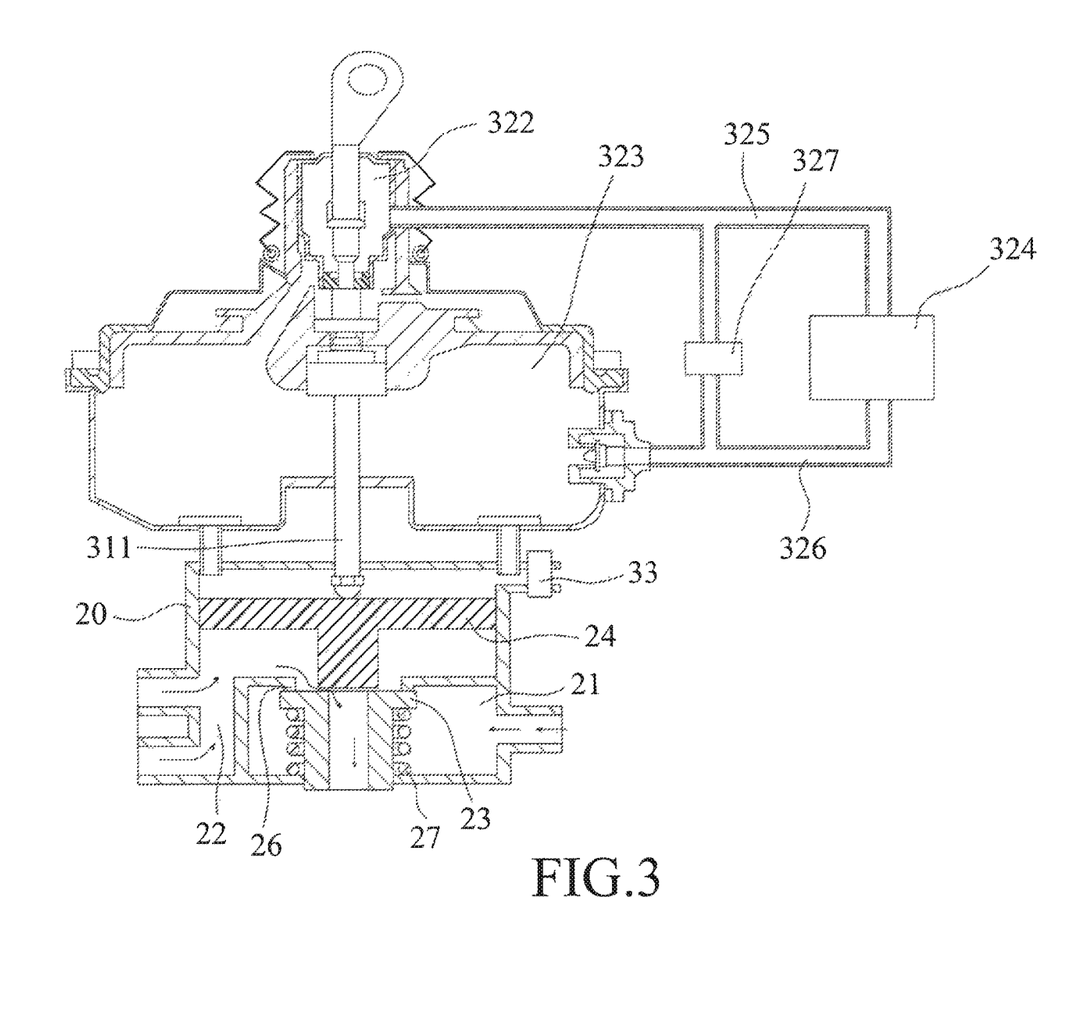
FIG. 3 is a schematic, partly-sectional view illustrating a state when the piston is returned to its original position.

Referring to FIGS. 1 and 3, when the driver releases the brake pedal 94, no brake signal is sent from the electronic control unit 91 such that the restoration solenoid valve 327 is de-energized to permit fluid communication between the outlet and intake tubular segments 325, 326 so as to equalize the pressure in the first and second chamber portions 322, 323. At this stage, the valve member 23 is not pressed by the piston 24 and is returned to the normal closed position by means of the biasing member 27 so as to obstruct the air flow between the air supply and the delivery chambers 21, 22.

Accordingly, since, during the braking action, the brake signal is sent from the electronic control unit 91 to release pressurized air to drive the stem assembly 31 to move the valve member 23 to the opened position, the response time is relatively short, as compared with the prior art, where the relay valve is opened by means of air pressure. Thus, a braking performance is enhanced.

Furthermore, the back-up solenoid valve 33 is in fluid communication with the back-up supply chamber 25 and the brake pedal 94. Once malfunction of the actuating assembly 32 occurs, the back-up solenoid valve 33 is shifted to permit a fluid communication of the back-up supply chamber 25 such that the brake pedal 94, the back-up solenoid valve 33 and the relay valve 2 cooperatively serve as a brake system commonly known in the art. Hence, the relay valve module of this embodiment is compatible with a conventional brake system to facilitate replacement and usability.

Figure 4:
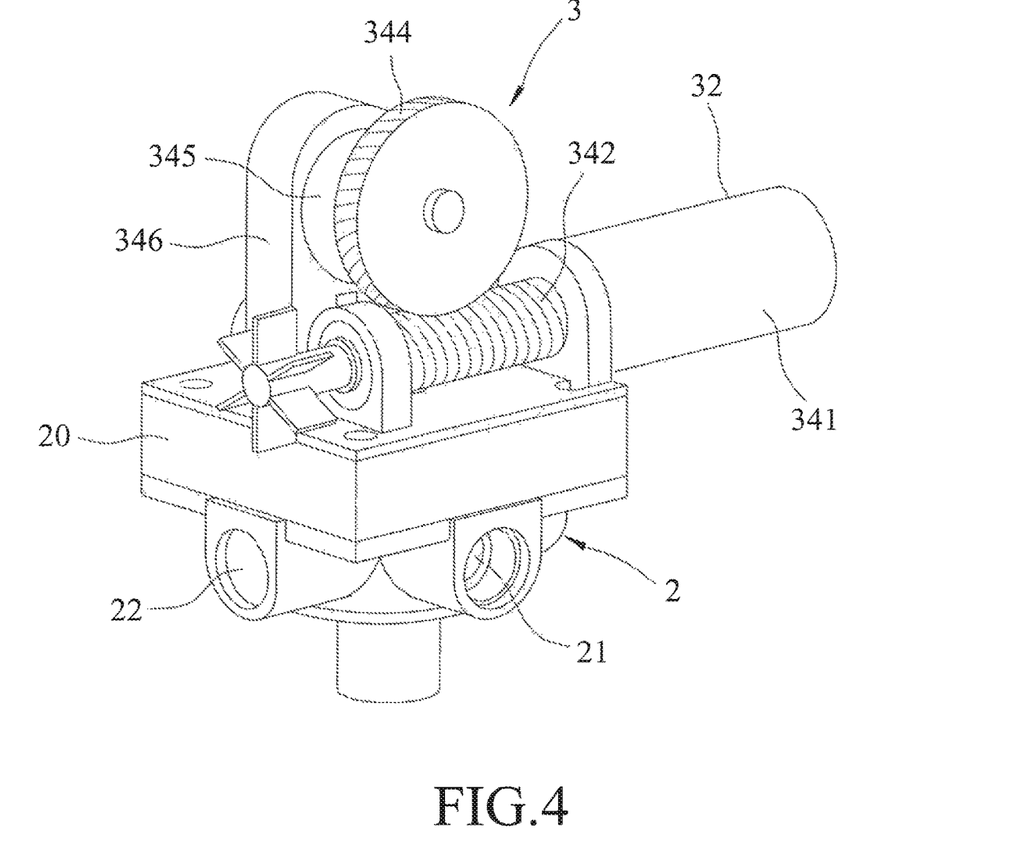
FIG. 4 is a perspective view illustrating another embodiment of the relay valve module according to this disclosure.
Figure 5:
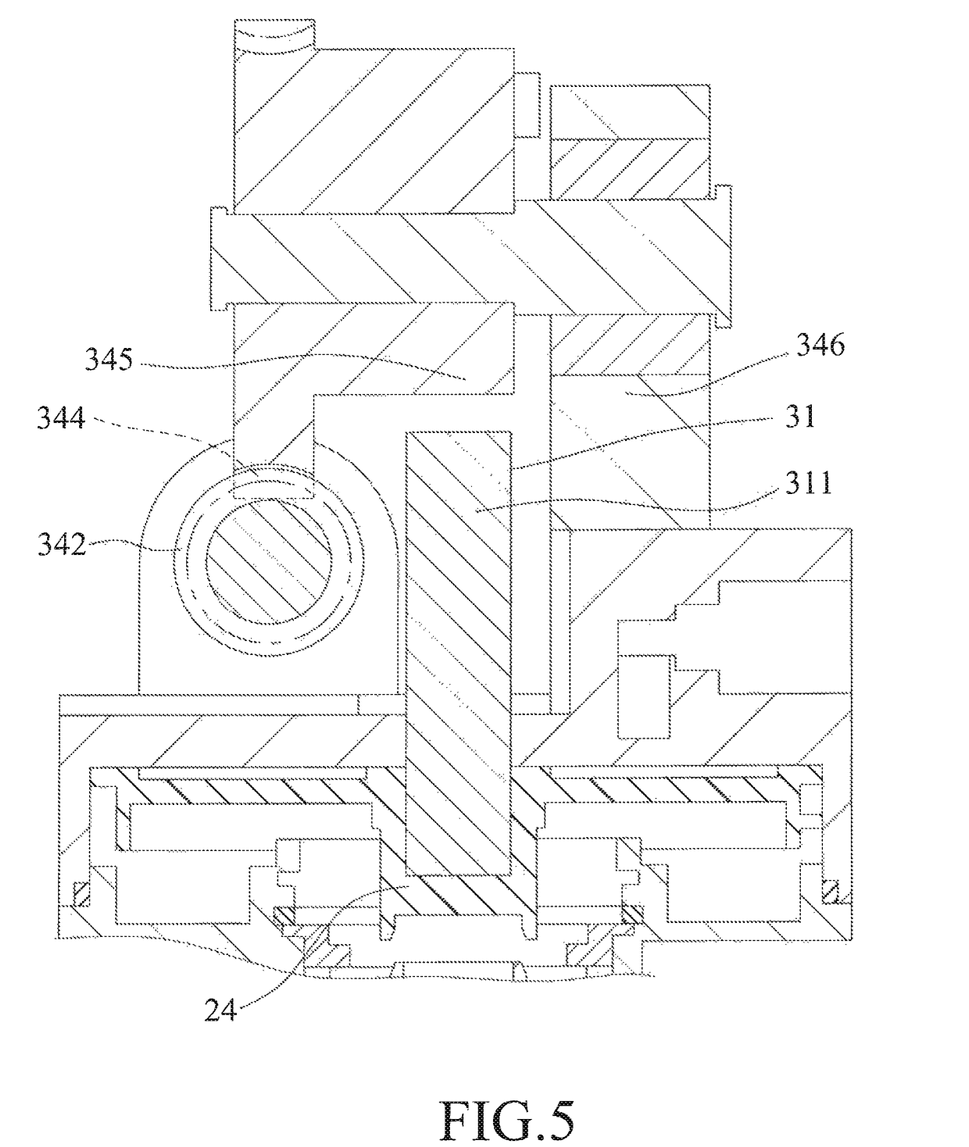
FIG. 5 is a fragmentary sectional view illustrating a state when a piston of the embodiment in FIG. 4 is not pressed.
Figure 6:
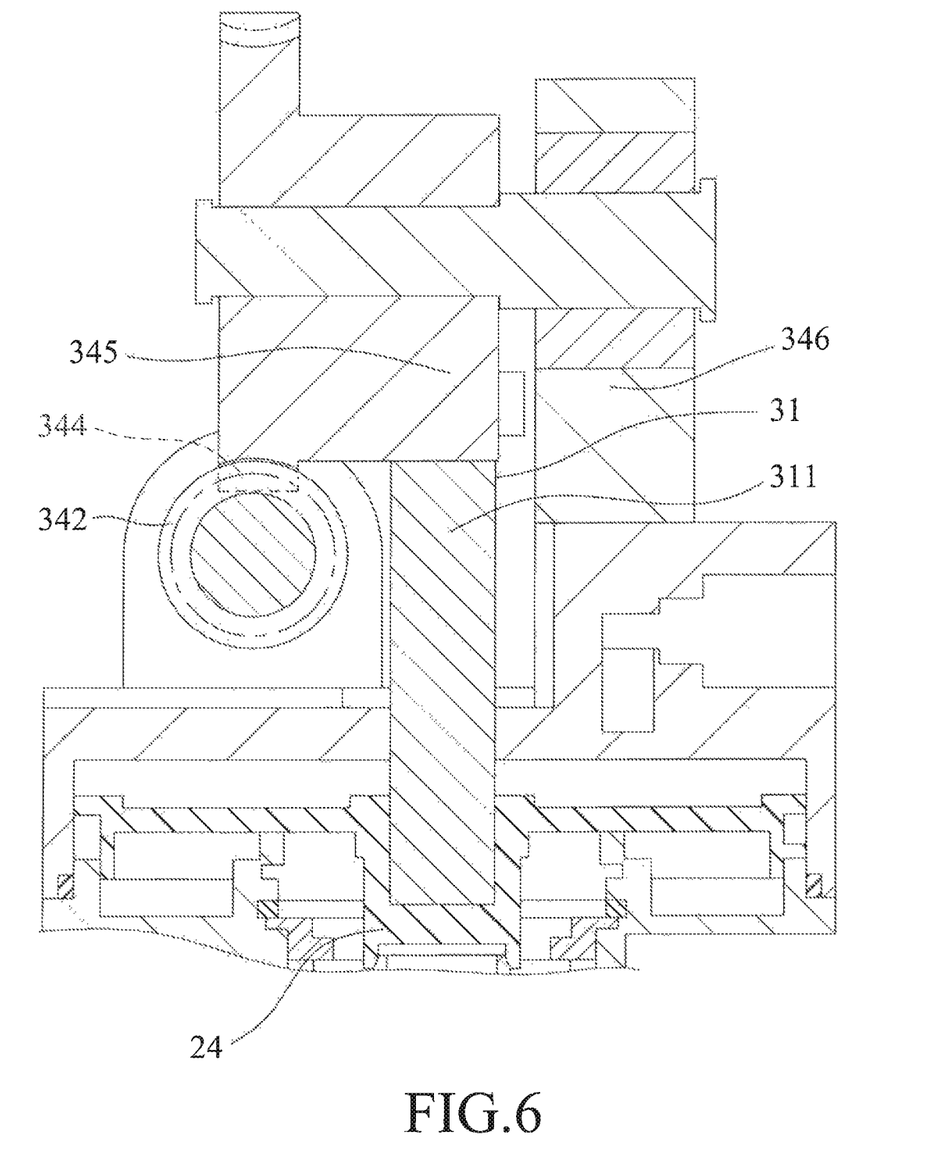
FIG. 6 is a fragmentary sectional view illustrating a state when the piston of the embodiment in FIG. 4 is pressed.

Referring to FIGS. 4 to 6, another embodiment of the relay valve module according to this disclosure is different from the above-mentioned embodiment in that the partition 312 (see FIG. 1) of the stem assembly 31 is omitted, and that the actuating assembly 32 has a motor 341 disposed adjacent to the relay valve 2 and electrically connected with the electronic control unit 91 (see FIG. 1), a worm drive 342, 344 coupled with the motor 341 to transmit a torque, a cam 345 connected between the worm drive 342, 344 and the stem assembly 31 to transform a rotation of the cam 345 by the torque to a linear motion to provide the pressure to the stem assembly 31. Specifically, the worm drive 342, 344 includes a worm 342 connected to and rotated with the motor 341, and a worm, gear 344 meshing with the worm 342 to rotate so as to generate the torque. The cam 345 is eccentrically connected with the worm gear 344 and is rotatably supported on a support 346 that is mounted on the valve body 20 of the relay valve 2.

When the motor 341 receives a brake signal sent from the electronic control unit 91 and is activated to rotate the worm, drive 342, 344 and the cam 345, the stem assembly 31 is pressed by the linear motion of the cam 345 to move the piston 24 to the opened position.

As illustrated, with the actuating assembly 32 and the stem assembly 31, the actuating assembly 32 can regulate the state of the relay valve 2 by pressing the piston 24 so as to perform a braking action, which accelerates the response speed of braking and enhances the brake performance.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A relay valve module of a pneumatic brake system for a vehicle which includes an electronic control unit, cylinders, said, relay valve module comprising:

a relay valve having a valve body which defines therein an air supply chamber in fluid communication with the supply air reservoir and a delivery chamber in fluid communication with the brake cylinders, a valve seat which is disposed between said air supply and delivery chambers, a valve member which is disposed to be moved relative to said valve body between an opened position, where said valve member is remote from said valve seat to permit air flow from said air supply chamber to said delivery chamber, and a normal closed position, where said valve member contacts said valve seat to obstruct the air flow, and a piston, which is disposed within and slidable relative to said valve body to move said valve member to the opened position;

an actuating unit including a stem assembly which has a first end disposed within said valve body and adjacent to said piston, and which is moved by a pressure to permit said first end to be engaged with and press said piston so as to move said valve member to the opened position, and an actuating assembly which is electrically connected with the electronic control unit to receive a brake signal therefrom to provide the pressure to said stem assembly.

2. The relay valve module as claimed in claim 1, wherein said actuating assembly has a housing which is mounted on said valve body and which defines a chamber therein, said stem assembly having a second end which is disposed in said chamber and which has a partition that is configured to partition said chamber into first and second chamber portions chat are respectively distal from and proximate to said piston, said actuating assembly further having a vacuum pump which is electrically connected with the electronic control unit and which has an outlet tubular segment that is disposed to be in fluid communication with and to supply air to said first chamber portion so as to generate the pressure in said first chamber portion sufficient to move said stem assembly, and an intake tubular segment that is disposed to be in fluid communication with said second chamber portion to receive returned air from said second chamber portion.

3. The relay valve module as claimed in claim 2, wherein said stem assembly has a stem extending along an axis to have said first and second ends, said partition being disposed on and extending radially from said stem to be slidable relative to said housing along the axis and having first and second pressed surfaces that face said first and second chamber portions, respectively.

4. The relay valve module as claimed in claim 3, wherein said actuating assembly has a restoration solenoid valve which is electrically connected with the electronic control unit, and which has two ports respectively in fluid communication with said outlet and intake tubular segments to be energized responsive to a brake signal to shut off fluid communication with said outlet and intake tubular segments.

5. The relay valve module as claimed in claim 1, wherein said valve body of said relay valve defines therein a back-up supply chamber at an opposite side of said piston relative to said valve member and in which said first end of said stem assembly is disposed, said actuating unit including a back-up solenoid valve which is electrically connected with the electronic control unit, and which is in fluid communication with said back-up supply chamber to be energized responsive to a brake signal to supply air to said back-up supply chamber so as to provide an air pressure to press said piston.

6. The relay valve module as claimed in claim 1, wherein said actuating assembly has a motor disposed adjacent to said relay valve and electrically connected with the electronic control unit, a worm drive coupled with said motor to transmit a torque, a cam connected between said worm drive and said stem assembly to transform a rotation of said cam by the torque to a linear motion to provide the pressure to said stem assembly.

7. The relay valve module as claimed in claim 6, wherein said actuating assembly has a support mounted on said valve body of said relay valve to rotatably support said cam thereon.

8. The relay valve module as claimed in claim 1, wherein said valve seat of said relay valve confines a valve opening through which said piston is extended to engage and press said valve member to the opened position, said relay valve having a biasing member which is disposed to bias said valve member to the normal closed position.

* * * * *